US011734102B1

(12) United States Patent
Wang et al.

(10) Patent No.: US 11,734,102 B1
(45) Date of Patent: Aug. 22, 2023

(54) SYSTEM AND METHOD FOR THE PREDICTION OF ROOT CAUSE OF SYSTEM OPERATION AND ACTIONS TO RESOLVE THE SYSTEM OPERATION

(71) Applicant: Dell Products L.P., Round Rock, TX (US)

(72) Inventors: Dale Wang, Hayward, CA (US); Min Gong, Shanghai (CN); Ashok Narayanan Potti, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/722,870

(22) Filed: Apr. 18, 2022

(51) Int. Cl.
    *G06F 11/07* (2006.01)
(52) U.S. Cl.
    CPC ...... *G06F 11/0793* (2013.01); *G06F 11/0709* (2013.01); *G06F 11/079* (2013.01)
(58) Field of Classification Search
    CPC . G06F 11/0709; G06F 11/079; G06F 11/0793
    See application file for complete search history.

(56) References Cited

U.S. PATENT DOCUMENTS

| 10,572,329 | B2* | 2/2020 | Harutyunyan | G06F 11/3476 |
| 2022/0283890 | A1* | 9/2022 | Chopra | G06F 11/1433 |
| 2022/0358005 | A1* | 11/2022 | Saha | G06F 40/216 |

* cited by examiner

*Primary Examiner* — Joseph R Kudirka
(74) *Attorney, Agent, or Firm* — Womble Bond Dickinson (US) LLP

(57) ABSTRACT

Methods and systems for managing data processing systems are disclosed. A data processing system may include hardware and/or software components. The operation of the data processing system may depend on the operation of these components. To manage the operation of the data processing system, a system may include a data processing system manager. The data processing system manager may obtain logs for components of the data processing system reflecting the historical operation of these components and use the log to predict the future operation of the data processing system, actions that may be performed to address predicted undesirable operation of the data processing system, and/or for other purposes. Based on the predictions, the data processing system manager may take action to reduce the likelihood of the data processing system operating in an undesirable manner.

20 Claims, 8 Drawing Sheets

SYSTEM AND METHOD FOR THE PREDICTION OF ROOT CAUSE OF SYSTEM OPERATION AND ACTIONS TO RESOLVE THE SYSTEM OPERATION

FIELD

Embodiments disclosed herein relate generally to device management. More particularly, embodiments disclosed herein relate to systems and methods to manage the operation of devices through predictive analysis of log.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
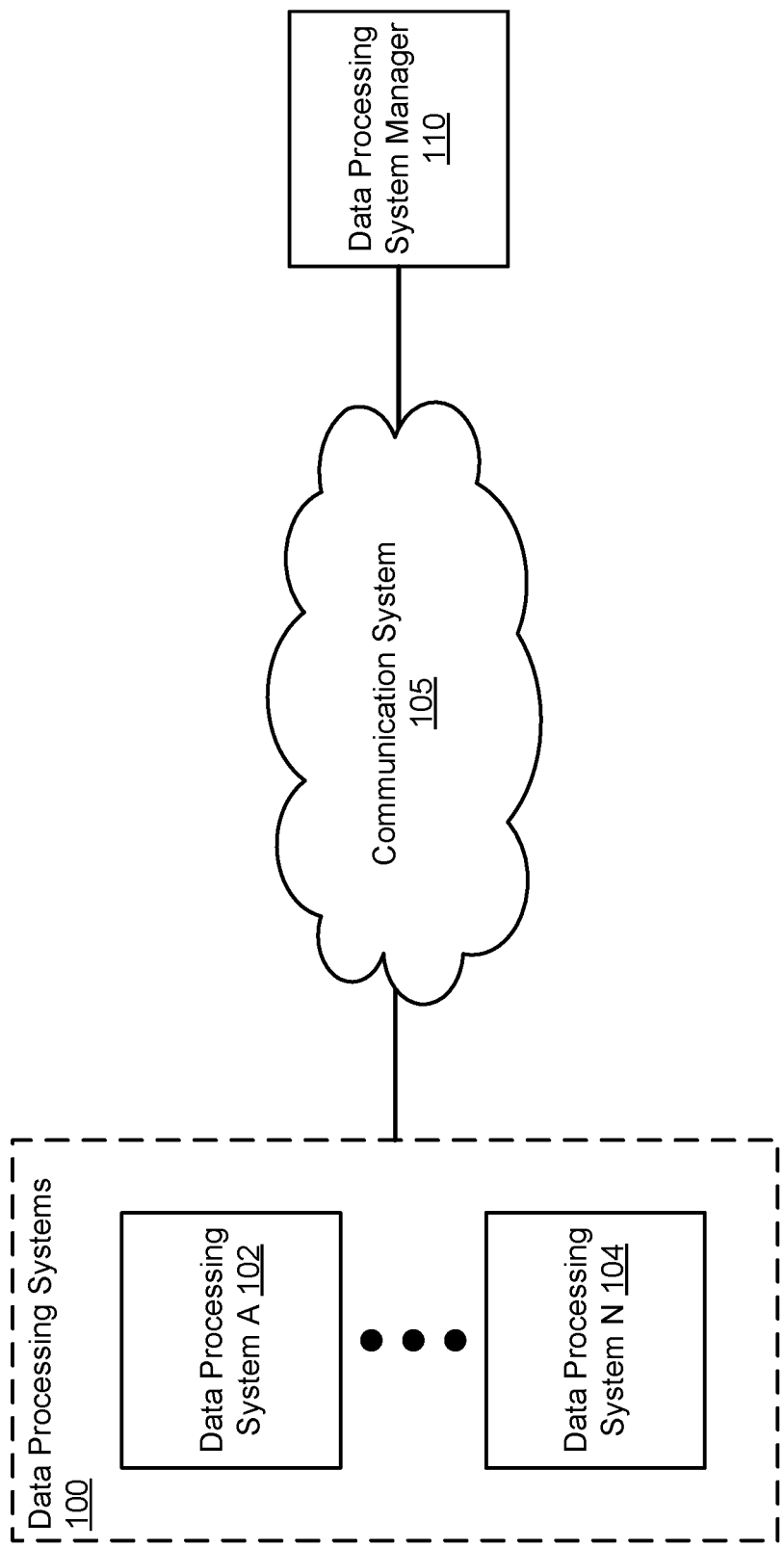
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing system. A data processing system may include one or more hardware and/or software components. The operation of the data processing system may depend on the operation of these components. For example, improper operation of any of these components may impair (e.g., reduce performance, reduce functionality, etc.) the operation of the data processing system.

To manage the operation of the data processing system, the system may include a data processing system manager. The data processing system manager may obtain logs for data processing systems reflecting the historical operation of these data processing systems and use the log to predict the future operation of the data processing system, potential actions for resolving issues with the future operation of the data processing systems, and/or to provide other functions.

To do so, the data processing system manager may identify issue and resolution clusters using the logs. The issue and resolution clusters may be used to establish relationships on which an inference model may be trained. The inference model (e.g., a trained machine learning model) may be adapted to predict a future event based on a set of log records, actions that may be used to resolve the event, a time to resolve the event for the different actions, a likelihood of the actions resolving the event, and/or other information usable to ascertain how to manage data processing systems.

When new logs are obtained, the new logs may be processed to identify whether any undesirable operations may occur. If the new logs indicate that undesirable operation may occur, then the system may take action to reduce the impact of the undesirable operation on the system.

By doing so, an improved computing device and/or distributed system may be obtained. The improved device and/or system may have higher uptime and/or may be more resilient to impairment.

In an embodiment, a computer-implemented method for managing data processing systems is provided. The method may include obtaining logs for the data processing systems, each of the logs comprising a first portion of log records associated with an event and a second portion of the log records associated with a resolution for the event; identifying an issue cluster based on the first portion of log records for each of the logs; identifying a resolution cluster based on the second portion of the log records for each of the logs; obtaining a trained machine learning model using the issue cluster and resolution cluster for each of the logs, the trained machine learning model being adapted to predict, for a new first portion of log records: sets of actions that when performed are likely to lead to the resolution, a resolution time between the event and the resolution for each of the sets of actions; obtaining a data processing system support request for a data processing system of the data processing system, the support request including a new portion of log records; obtaining, using the trained machine learning model and the new portion of log records, a prediction package, the prediction package comprising: a predicted event, a portion of the sets of actions that are likely to lead to a predicted resolution for the predicted event, and predicted resolution times for the sets of actions; performing an action set, based on the prediction package, to service the data processing system support request.

Identifying the issue cluster based on the first portion of log records for each of the logs may include calculating similarity level between each of the first portion of log records of the logs; and grouping the first portion of log records into issue clusters based on the calculated similarity levels between each of the first portion of log records of the logs.

Identifying the resolution cluster based on the second portion of the log records for each of the logs may include, for each of the issue clusters: calculating similarity level between each of the second portion of the log records of the logs that are associated with the respective issue cluster; and grouping the second portion of the log records of the logs that are associated with the respective issue cluster into resolution clusters based on the calculated similarity levels between each of the second portion of the log records of the logs that are associated with the respective issue cluster to obtain a portion of the resolution clusters that are associated with each of the issue clusters.

Obtaining the trained machine learning model using the issue cluster and resolution cluster for each of the logs may include obtaining a set of associations between an event associated with an issue cluster of the issue clusters and the sets of actions associated with each resolution clusters of the portion of resolution clusters that are associated with the issue cluster; training a machine learning model based on the set of associations.

The set of associations may be further obtained by: associating a resolution time with each respective event for each of the associated sets of actions, the set of associations thereby providing, for a given event, any number of sets of actions and resolution times for the sets of actions.

Performing the action set, based on the prediction package, to service the data processing system support request may include rank ordering the portion of the sets of actions based on the prediction resolution times for the sets of actions; and performing a set of actions of the portion of the sets of actions based on the rank ordering of the portions of the sets of actions.

Performing the set of actions of the sets of actions based on the rank ordering of the portions of the sets of actions may include presenting a graphical user interface to a user based on the rank ordering of the portion of the sets of actions; and receiving user feedback via the graphical user interface, the user feedback selecting the set of actions of the sets of actions.

The set of actions of the portion of the sets of actions may include shipping a replacement hardware component to the data processing system of the data processing systems, performing maintenance on a hardware component of the data processing system of the data processing systems, disabling a function of a data processing system of the data processing systems, transferring a workload from a first data processing system of the data processing systems to a second data processing system of the data processing systems, disabling a hardware component of a data processing system of the data processing systems, and/or sending a notification to an administrator of a data processing system of the data processing systems of a predicted impairment of the data processing system.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer implemented services. The system may include data processing systems 100. Data processing systems 100 may include any number of computing devices that provide the computer implemented services. For example, data processing systems 100 may include one or more data processing systems 102, 104 that may independently and/or cooperatively provide the computer implemented services.

For example, all, or a portion, of data processing systems 102-104 may provide computer implemented services to users and/or other computing devices operably connected to data processing systems 100. The computer implemented services may include any type and quantity of services including, for example, database services, instant messaging services, video conferencing services, etc. Different systems may provide similar and/or different computer implemented services.

To provide the computer implemented services, data processing systems 100 may host applications that provide these (and/or other) computer implemented services. The applications may be hosted by one or more of data processing systems 100.

Any of data processing systems 102-104, and components thereof, as well as hosted entities (e.g., applications that provide computer implemented services, other applications that manage the operation of data processing systems 100, etc.), may be subject to undesired operation. For example, due to various operating conditions, flaws in design, and/or for other reasons, any of these hardware and/or software components may operate in a manner that diverges from nominal (e.g., desired) operation.

When operating, any of these components may generate one or more logs. A log may be a data structure that include operational information regarding data processing systems 100 such as, for example, descriptions of conditions encountered by a component, a time when the condition was encountered, an identifier associated with a condition and/or generator of the log, an indication of a relative level of importance or severity of the encountered conditions, and/or other types of information. While the logs may include information regarding the current operation of data processing systems 100, the logs may not specify how the data processing systems 100 and/or components thereof are likely to operate in the future, whether the operation is similar to the operation of other data processing systems, what action may be taken to resolve the future undesired operation, and/or may lack other information that may be used to managed data processing systems 100. Rather, the logs may generally include a representation of current and/or past operation of all or a portion of data processing systems 100. Thus, the logs may not be useful for proactively addressing potential future operating conditions of data processing systems 100, identifying common operational states among data processing systems 100, and/or root causes of undesired operation of data processing systems 100.

In additional to information regarding the operation of a data processing system leading up to an event, the logs may also include information regarding the operation of the data processing system between when the event occurred and resolution of the vent. Like the information regarding the operation of the data processing system leading up to the event, the information regarding the operation of the data processing system following the event and proceeding the resolution may be difficult to use to identify whether actions performed following the event resolved the event. For example, the information following the event may indicate that multiple actions were performed to attempt to resolve the event (any of which may have contributed to or detracted from resolving the event), may include information unrelated to the event and/or actions leading up to the resolution, and/or may otherwise be difficult to interpret. Thus, the information included in logs may not lend itself to prediction of and remediation of event.

In general, embodiments disclosed herein may provide systems, devices, and methods for managing data processing systems to reduce the likelihood of the data processing systems operating in an undesired manager. A system in accordance with an embodiment may include data processing systems manager 110. Data processing system manager 110 may manage the operation of data processing systems 100.

To provide its functionality, data processing system manager 110 may (i) collect logs for the hardware and/or software components of data processing systems 100, (ii) identify issue clusters and resolution cluster using the logs, (iii) train one or more machine learning models to predict future events impacting the data processing systems and identify sets of actions that are likely to resolve the future events, and/or (iv) perform one or more actions (e.g., an "action set") to reduce the likelihood of data processing systems 100 operating in an undesirable manner in the future based on the predictions and suggestions generated using the one or more trained machine learning models. By doing so, a system in accordance with embodiments disclosed herein may provide data processing systems having, for example, (i) improved uptime through proactive and/or automated reconfiguration to avoid/remediate future events, (ii) improved user experiences by avoiding phantom slowdowns and/or pauses (e.g., due to undesired operating behavior associated with various events), and/or (iii) improve computing resource availability for desired computer implemented services by reducing computing resource expenditures for management and/or remedial action.

Figure 3A:
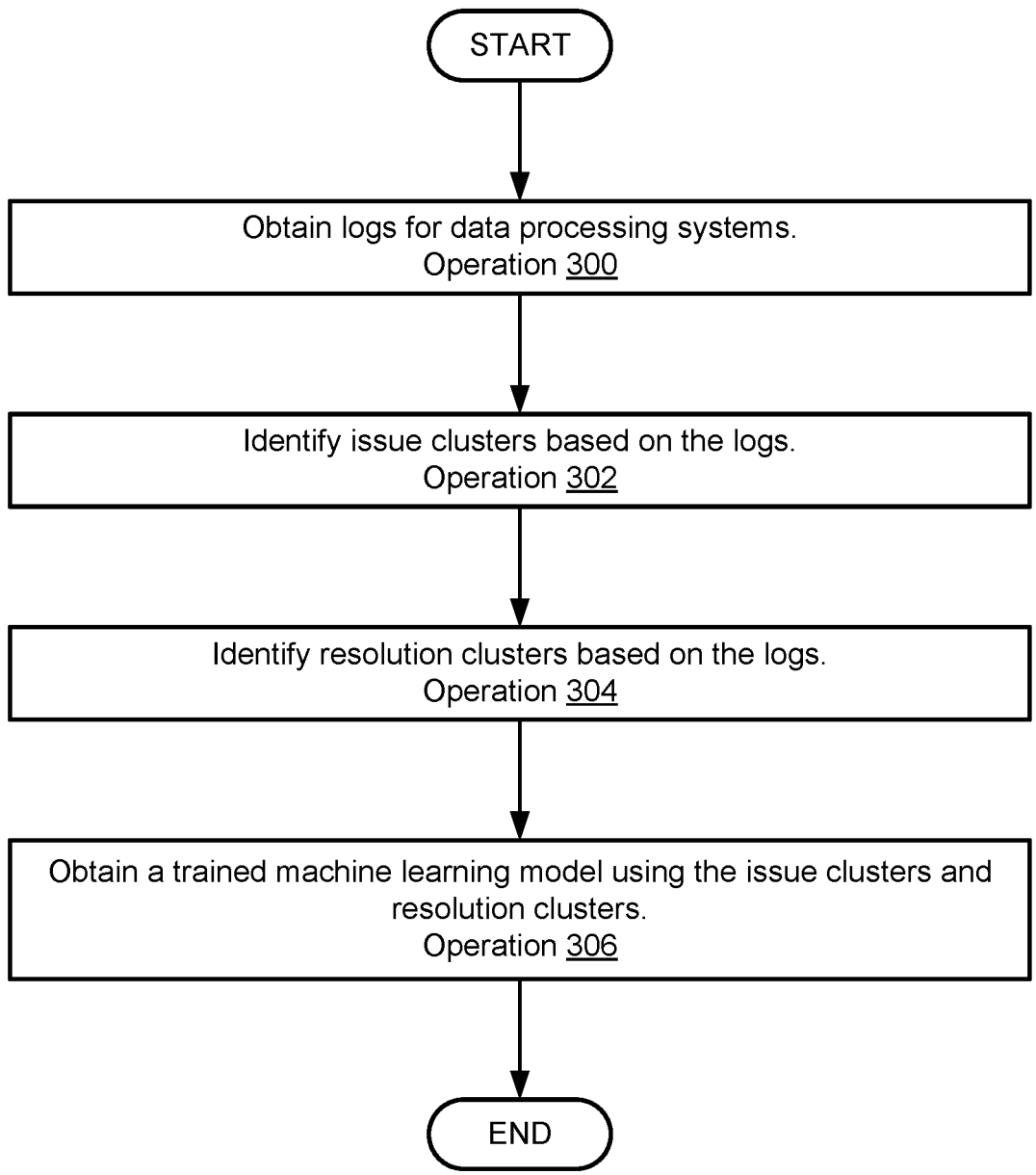
FIG. 3A shows a flow diagram illustrating a method of obtaining a trained machine learning model in accordance with an embodiment.
Figure 3B:
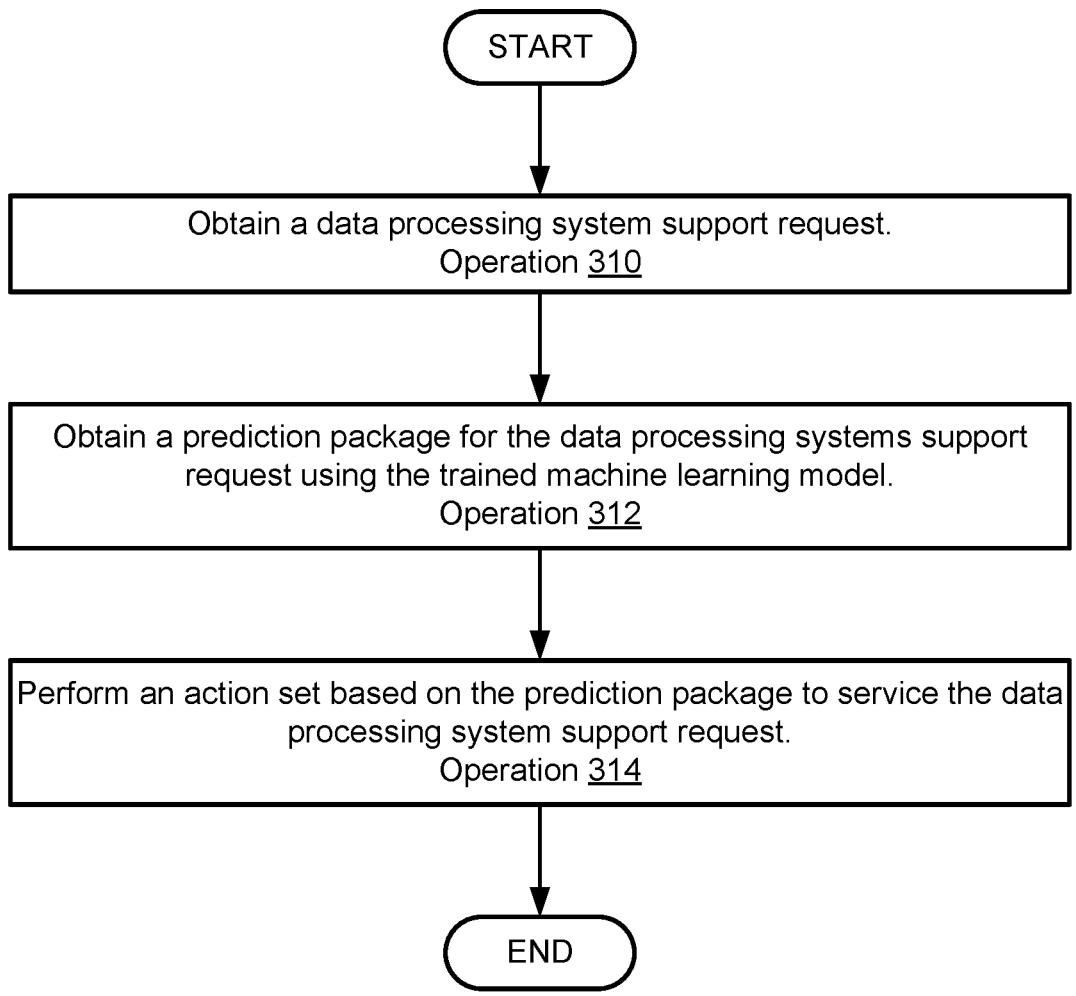
FIG. 3B shows a flow diagram illustrating a method of servicing a support request in accordance with an embodiment.
Figure 4:
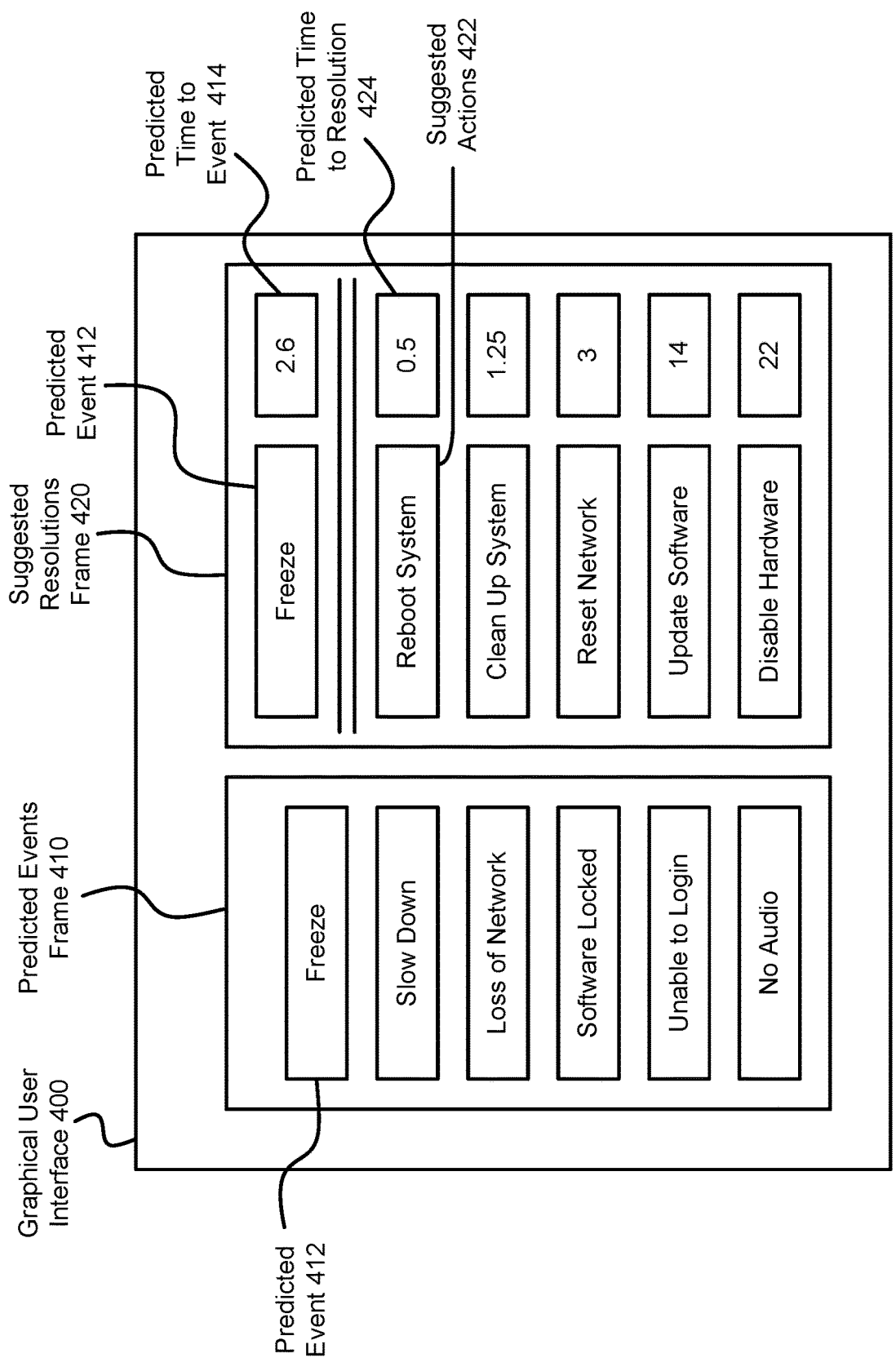
FIG. 4 shows a diagram illustrating a graphical user interface in accordance with an embodiment.

When providing its functionality, deployment manager may perform all, or a portion, of the methods and/or actions shown in FIGS. 3A-4.

Data processing systems 100 and/or data processing system manager 110 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 5.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as included a limited number of specific components, a system in accordance with an embodiment may include fewer, additional, and/or different components than those illustrated therein.

As discussed above, embodiments disclosed herein may provide a method and system for managing data processing systems using logs. As noted above, the logs may be difficult to use for management purpose because they may simply include a listing of observations regarding the operation of a data processing system (or portion thereof) over time. The logs may not include metadata that allows for automated analysis. Rather, many fields of the logs may include unstructured data that expects a person to utilize the unstructured data. To address these and/or other challenges, embodiments disclosed here may provide a method for automated analysis of logs that facilitate management of data processing systems.

Figure 2A:
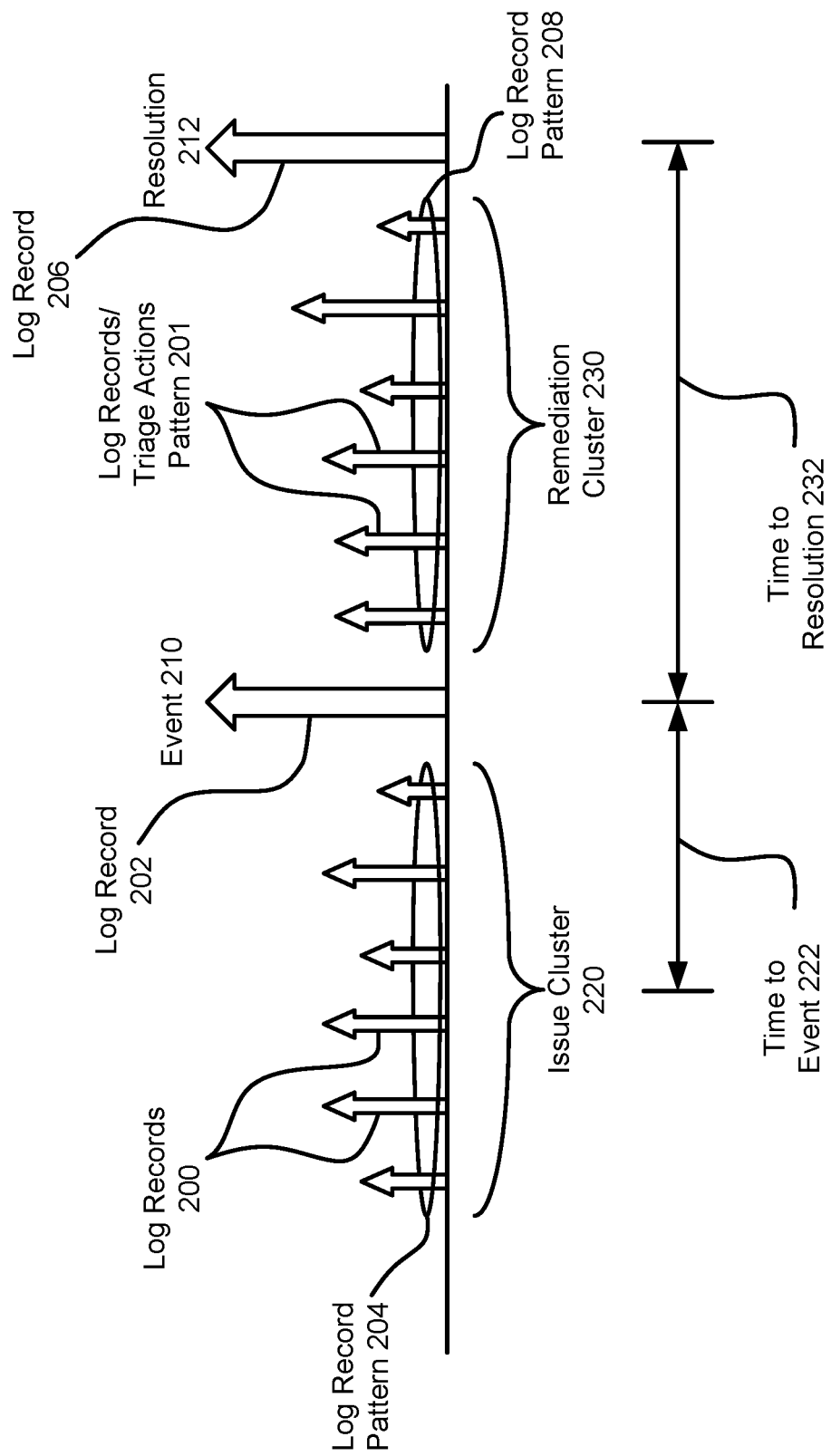
FIG. 2A shows a block diagram the informational content of one or more logs in accordance with an embodiment.

Turning to FIG. 2A, a diagram illustrating the information content of a example log in accordance with an embodiment is shown. A log may include any number of log records (e.g., also referred to as a "log entry"). The log records may include various portions of data regarding the operation of a data processing system. For example, a log record may include (i) an record identifier, (ii) a time stamp (or other type of ordering information), (iii) a description of a portion of the operation of the data processing system (which may be in an unstructured format or other format that is expected to be interpreted by a person rather than a computing device), and/or (iv) other information regarding a data processing system.

In FIG. 2A, log records 200 are indicating using oversized arrows, with the records being temporally ordered from earlier to later from left to right in the diagram. When a data processing system encounters an event 210, a log entry (e.g., 202) corresponding to the entry may be added to the log. Likewise, when a resolution 212 to the event 210 is encountered, a log entry (e.g., 206) may be added to the log.

However, the relationships between the other log records 200 and the event 210 and resolution 212 may not be explicitly defined in the log records 200. Thus, it may not be clear, for example, which of the log records preceding event 210 may be predictive of event 210, and which of the log records following event 210 and preceding resolution 212 contributed to the occurrence of resolution 212.

To establish such relationships, a log record pattern 204 preceding the event may be used to identify similarities and dissimilarities between the log and other logs usable to classify the log into an issue cluster 220. Each of the logs in the issue cluster may be treated as though a similar root cause leads to the event 210 common in all of the logs in the issue cluster.

Likewise, a log record pattern 208 following event 210 and preceding resolution 212 may be used to identify similarities and dissimilarities between the log and other logs usable to classify the log into a remediation cluster 230 associated with the issue cluster 220. Each of the logs in the remediation cluster may be treated as though a similar approach to resolving the event 210 common in all of the logs in the issue cluster 220 was attempted. Because different approaches may have been attempt to resolve an event encountered by various data processing systems, there may be multiple remediation clusters for each issue cluster with each remediation cluster being associated with a different approach to resolving the event associated with the issue cluster 220.

While logs may generally include information regarding the operation of the data processing systems, in some cases, the logs may be supplemented with information regarding the actions performed to resolve the event. For example, when administrative actions are performed to attempt to resolve an event, the actions may be logged as triage actions. Consequently, as seen in FIG. 2A, the informational content of the log may be supplemented with information from a triage log to better establish a log records/triage actions pattern 201. Thus, the log record pattern 208 following an event and preceding a resolution may include information from multiple types of logs.

Figure 2B:
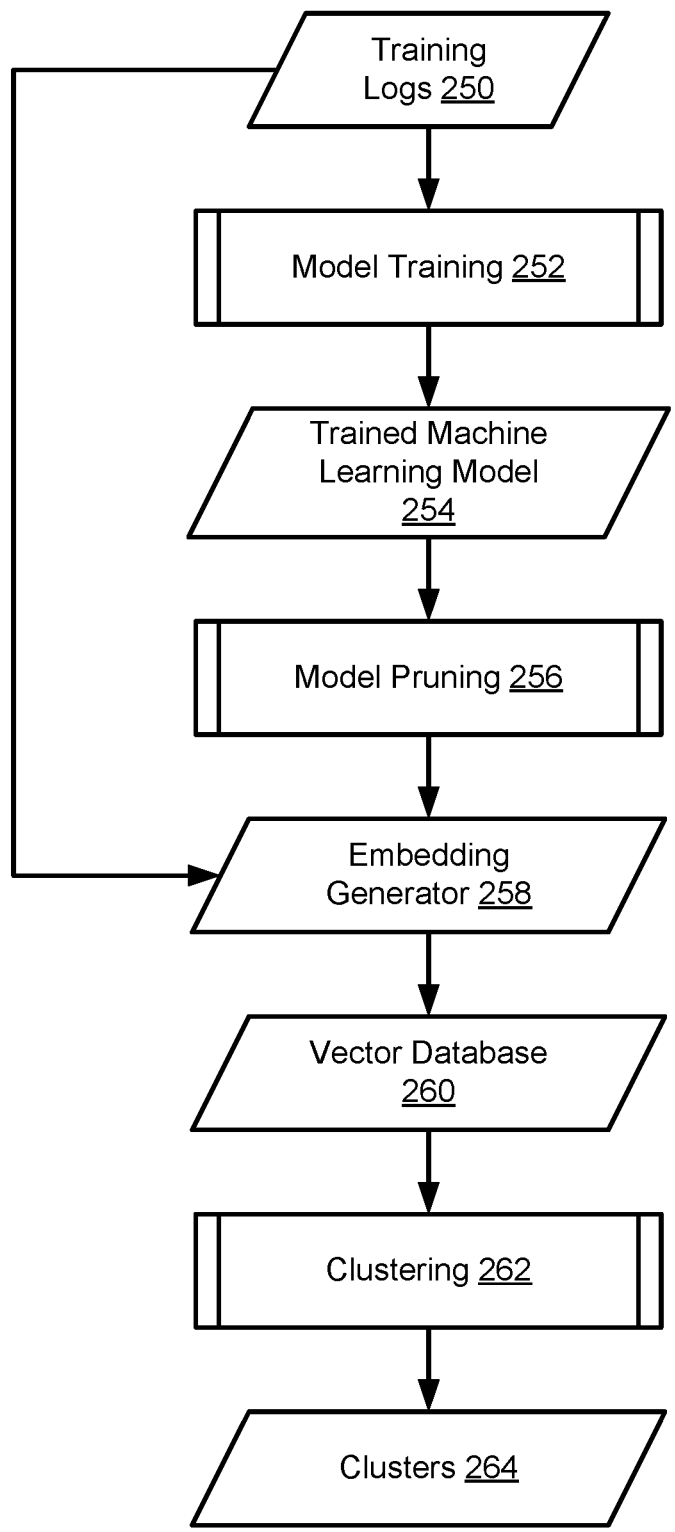
FIG. 2B shows a block diagram of a process for identifying clusters in accordance with an embodiment.

The issue clusters and remediation clusters from any number of logs may be identified via, for example, a classification process using a machine learning model. Refer to FIG. 2B for additional details regarding issue and remediation cluster identification.

In addition to identifying membership in an issue cluster 220 and a remediation cluster 230, various durations of time may also be identified. For example, a time to event 222 from the occurrence of a log record pattern 204 may be identified. The time to event 222 may be the time from when a log pattern occurs to when an event occurs subsequent to the log pattern. Similarly, a time to resolution 232 from the occurrence of the event to the resolution 212 may also be identified. The time to resolution 232 may be the time from when an event (e.g., 210) occurs to when the resolution 212 (e.g., 212) of that event occurs.

To manage data processing systems using the above noted information, one or more machine learning models may be trained to predict, based on a log message pattern, (i) an event (if any, some message patterns may not be associated with events)) that is likely to occur, (ii) the time to the event 222, (iii) the likelihood of the event occurring following the message pattern, (iv) sets of actions that may lead to the resolution 212, (v) the time to resolution 232 for following the predicted even for the respective sets of actions, and/or (vi) the likelihood of the resolution occurring following the performance of the respective sets of actions. Refer to FIG. 3A for additional details regarding obtaining machine learning models.

Turning to FIG. 2B, operation of a data processing system manager in accordance with an embodiment is shown. Specifically, FIG. 2B may illustrate a process through which issue and resolution clusters in logs may be identified.

To manage the data processing systems, data processing system manager 110 may obtain training logs 250. Training logs may be obtained from any number of data processing systems managed by data processing system manager 110. The training logs may include any type and quantity of logs. The logs may include descriptions of actions leading up to an event, actions performed following the event to resolve the event, and/or a description of the event and/or resolution. The logs may be implemented with structure or unstructured data.

The training logs may also include logs (e.g., management logs) of actions performed to resolve the events. These logs may be obtained from any number of sources such as, for example, control planes or other entities that manage reconfiguration and/or management of data processing systems. The management logs may be used to supplement the information included in the logs from the data processing system to better establish a time actions that may be performed to resolve an event.

To utilize the training logs 250, data processing system manager 110 may perform actions to obtain vector database 260. Vector database 260 may facilitate rapid identification of similarities between logs, and/or portion thereof. To obtain vector database 260, data processing system manager 110 may perform model training 252 to obtain one or more trained machine learning models. The trained machine learning models may be, for example, implemented supervised learning (e.g., if training logs 250 are labeled) or unsupervised learning (e.g., if training logs 250 are unlabeled). The trained machine learning models may be implemented using other modalities (e.g., semi-supervised learning, reinforced learning, associative rules, etc.).

The models may, for example, be implemented with artificial neural networks, decision trees, support-vector machines, regression analysis, Bayesian networks, genetic algorithms, and/or any other type of model usable for learning purposes.

The trained machine learning models (e.g., 254) may include any number and type of embedding layers. The embedding layers may include similar or different numbers of elements corresponding to vectors. When data is taken as input to a trained machine learning model, the data may be projected onto the first embedding layer. The value of each element of each subsequent embedding layer may depend on the value of one or more elements of the previous embedding layer. The final embedding layer may then be used to obtain an output (e.g., through transformation, projection, mapping, etc.).

To identify similarities between logs, or portions thereof, in a time and/or computationally efficient manner, vector database 260 may not use the output of the machine learning models. Rather, vector database 260 may be populated with an intermediate vector implemented by the trained machine learning model 254. By doing so, only reduced sized representations of logs, or portions thereof, may be used as the basis for identifying similarities between the logs, or portions thereof.

To obtain the intermediate vectors implemented by the trained machine learning model, the trained machine learning model may be subjected to model pruning 256. During model pruning, the model may be truncated at one of the embedding layers such that when a log, or portion thereof, is used as input to the pruned trained machine learning model, the output may be the intermediate vector value of a selected embedding layer. The pruned trained machine learning model may be used as an embedding generator that take, as input, logs (or portions thereof) and provides, as output, a vector corresponding to the input.

To obtain the vector database, training logs 250 (or portions thereof) may be input to embedding generator 258. Embedding generator 258 may provide, as output, a vector corresponding to the input. The vector may include any number of elements, but may generally be much smaller in size when compared to a size of the input.

To obtain vector database 260, the log records of each log preceding an event may be input to the embedding generator thereby generating a first vector corresponding to each of the logs. Likewise, the log records (and/or supplemented using other data) following the event and preceding the resolution of each log may also be input to the embedding generator thereby generating a second vector corresponding to each of the logs. These vectors may be stored in vector database 260.

To obtain the issue clusters, first vector associated with each of the logs in vector database 260 may be clustered using any clustering algorithm to identify groups of the first vectors that are similar to one another. These groups of the first vectors may be used as issue clusters with each of the logs associated with any of the first vector in a group being a member of the issue cluster.

To obtain the resolution clusters, second vector associated with each of the logs that are members of an issue cluster may be clustered using any clustering algorithm to identify groups of the second vectors that are similar to one another.

These groups of the second vectors may be used as resolutions clusters with each of the logs associated with any of the second vectors in a group being a member of the resolution cluster.

Through this process, clusters 264 may be established. Clusters 264 may include any number of issue clusters. Clusters 264 may also include, for each of the issue clusters, one or more resolution clusters. As discussed above, clusters 264 may be used as a basis for establishing relationships used to train one or more machine learning models. For example, for a given issue cluster, an association between the log record pattern preceding an event (e.g., common to all of the logs that are members of the issue cluster) and the sets of actions following the event leading to various resolution of the event/time to the various resolutions (e.g., common to the logs that are members of the resolution clusters associated with the issue cluster) may be established.

Figure 2C:
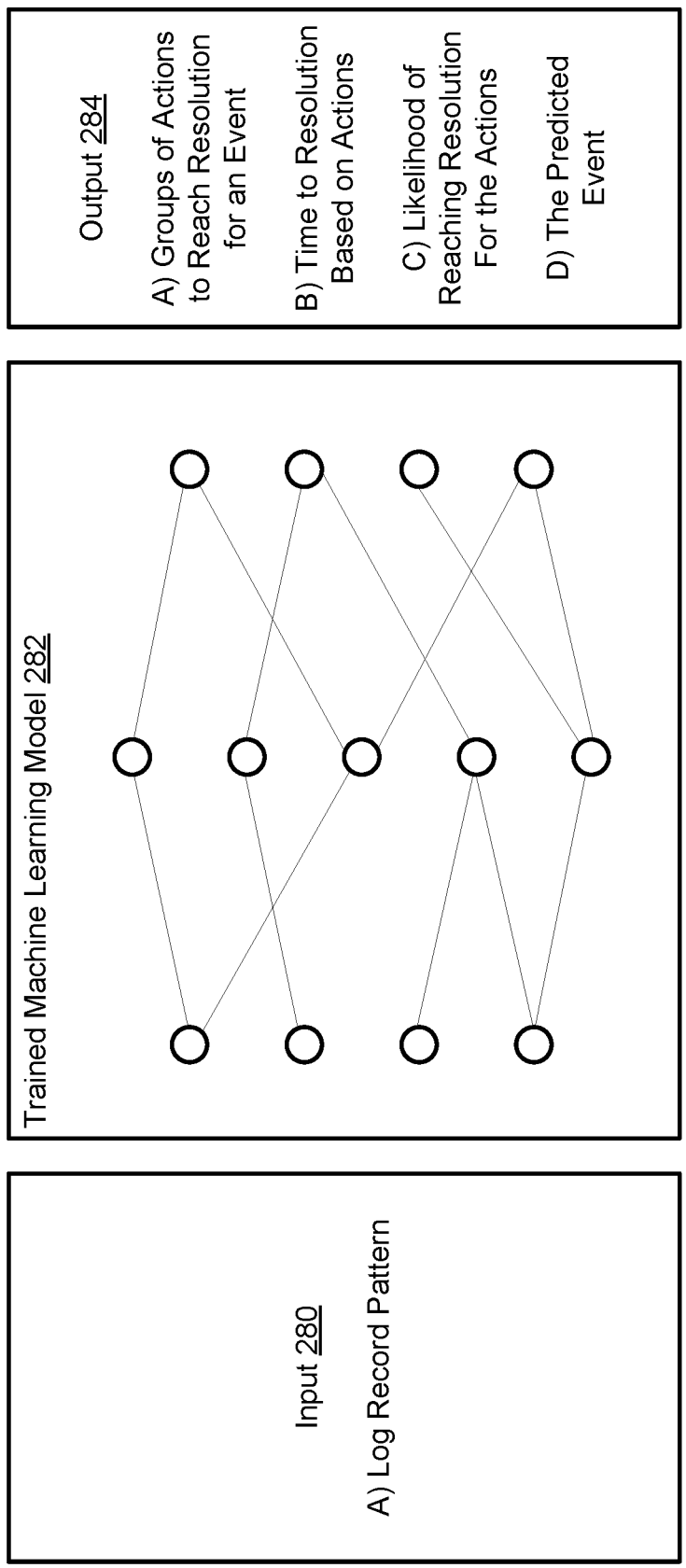
FIG. 2C shows a block diagram illustrating a trained machine learning model in accordance with an embodiment.

Turing to FIG. 2C, a diagram of a trained machine learning model 282 in accordance with an embodiment is shown. Trained machine learning model 282 may be implemented using any type of model. For example, trained machine learning model 282 may be implemented using an artificial neural network that includes any number of layers (e.g., represented by columns of circles shown in FIG. 2C).

Trained machine learning model 282 may take, as input 280, a log record pattern and generate, as output 284, (i) groups of actions that may each reach resolution for an event (which may not have occurred yet), (ii) a time to resolution for each of the groups of actions, and/or (iii) a likelihood of reaching the resolution for each of the groups of actions.

While illustrated in FIG. 2C as being implemented with a single trained machine learning model, a system may utilize multiple trained machine learning models without departing from embodiments disclosed herein. For example, a first trained machine learning model may take input 280 and output a predicted event that is likely to occur in the future. A second trained machine learning model may take the predicted event that is likely to occur in the future and provide output 284. The functionality of trained machine learning model 282 may be divided among any number of machine learning models without departing from embodiments disclosed herein.

As discussed above, the components of FIG. 1 may perform various methods to increase the likelihood of data processing systems being able to provide computer implemented services. FIGS. 3A-3B show diagrams of methods that may be performed by the system of FIG. 1. In each of these figures, any of the operations may be performed in different orders, skipped, repeated, and/or be performed in a parallel or partially overlapping in time manner.

Turning to FIG. 3A, a flow diagram illustrating a method of obtaining a trained machine learning model in accordance with an embodiment is shown.

At operation 300, logs for data processing systems are obtained. The logs may be obtained by receiving them from the data processing systems (e.g., which may generate and provide the logs) or by obtaining them from other sources (e.g., from devices which may aggregate and/or store logs for other devices). Any quantity of logs may be obtained. The logs may be obtained via network communications between the data processing system manager and other devices. The logs (e.g., management logs) may also be obtained from other entities. The information in the logs may be used, where appropriate, to supply other logs to obtain a better timeline of events that have previously occurred, and the corresponding actions leading the resolution of the events.

At operation 302, issue clusters are identified based on the logs. The issue clusters may be identified using a first portion of the logs. The first portion may correspond to log records preceding an event.

In an embodiment, the issue clusters are identified by obtaining a vector database and performing a clustering algorithm based on the content of the vector database for the first portion of the logs. Any number of issue clusters may be identified via this process. Refer to FIG. 2B for additional details regarding identifying issue clusters.

In an embodiment, the issue clusters are identified by calculating similarity level between each of the first portion of log records of the logs. The similarity level may then be used to group the first portion of the log records into the issue clusters based on the calculated similarity levels between each of the first portion of the log records of the logs.

At operation 304, resolution clusters are identified based on the logs. The resolution clusters may be identified using a second portion of the logs. The second portion of the logs may correspond to log records subsequent to the event and prior to a resolution. The second portion of the logs may also be supplemented with information from other logs, e.g., management logs.

In an embodiment, the resolution clusters are identified by obtaining a vector database and performing a clustering algorithm based on the content of the vector database for the second portion of the logs corresponding to each identified issue. Any number of resolution clusters associated with an issue cluster may be identified via this process. Refer to FIG. 2B for additional details regarding identifying resolution clusters.

In an embodiment, the resolution clusters for each of the issue clusters are identified by calculating similarity level between each of the second portion of the log records of the logs that are associated with the respective issue cluster. The similarity levels may be used to group the second portion of the log records of the logs that are associated with the respective issue cluster into the resolution clusters based on the calculated similarity levels.

The similarity level calculation may be performed, for example, by calculating distances between the vector representations in the vector database. These distances may then be used to calculate central moments and boundaries that define inclusion and/or exclusion boundaries for each of the clusters. These inclusion/exclusion boundaries may define the group memberships. The similarity level calculations may be performed via other methods without departing from embodiments disclosed herein.

At operation 306, a trained machine learning model is obtained using the issue clusters and the resolution clusters. The trained machine learning model may be adapted to predict, based on input such as a new first portion of log records (e.g., different than that used for cluster identification), sets of actions that when performed are likely to resolve an event (that may or may not have occurred) and resolution times for the sets of actions.

In an embodiment, the trained machine learning model is obtained by obtaining a set of associations between an event associated with an issue cluster of the issue clusters and the sets of actions associated with each resolution clusters of the portion of resolution clusters that are associated with the issue cluster. A machine learning model (or other type of inference model) may be trained based on the set of associations to obtain the trained machine learning model. The set of associations may be further obtained by associating a resolution time with each respective event for each of the associated sets of actions, the set of associations thereby providing, for a given event, any number of sets of actions and resolution times for the sets of actions.

In an embodiment, the set of associations are obtained by storing data in memory or storage representing these associations. The informational content of the associations may be obtained based on metadata or other associations included in the vector database which may associate the vectors in the database with corresponding information.

The trained machine learning model may be obtained via other methods, may be updated over time, and/or may be implemented using any number of sub-models without departing from embodiments disclosed herein.

The method may end following operation 306.

While described above with respect to performing processing of data, any of the information discussed with respect to operations 300-306 may be obtained from other entities (e.g., via network communications) without departing from embodiments disclosed herein.

Using the method illustrated in FIG. 3A, a trained machine learning model may be obtained that is usable to identify likely events, actions usable to resolve the events, and/or other information usable to manage data processing systems.

Turning to FIG. 3B, a flow diagram illustrating a method of servicing a data processing system support request in accordance with an embodiment is shown.

At operation 310, a data processing system support request is obtained. The data processing support request may be obtained from a data processing device operably connected to the data processing system manager. The request may request, for example, whether the operation of the data processing system should be modified to avoid potential future impairments.

In an embodiment, the data processing system support request includes a new portion of log records (e.g., a series of log entries) that has been obtained from a data processing system. The data processing system may be operating nominally or may be manifesting undesired operation.

At operation 312, a prediction package for the data processing system support request is obtained using the trained machine learning model. Refer to FIG. 3A for additional details regarding the trained machine learning model.

The prediction package may include a predicted event that is likely to occur, a portion of sets of actions that are likely to lead to a predicted resolution for the predicted event, and prediction resolution times for the sets of actions. The prediction package may also include, for example, the likelihood of the actions sets resolving the predicted events.

The prediction package may be obtained by using the new portion of log records as input to the trained machine learning model. The trained machine learning model may output the prediction package, or portions of content thereof, based on the input.

The likelihood of the actions sets resolving the predicted events may be predicted based on, for example, a diversity of outcomes that are predicted for a given action. Some of the outcomes for the action sets may be a null or no resolution of an event. Consequently, each of the actions sets may only be indicated as having a likelihood of resolving the event rather than certainly resolving the event.

In an embodiment, one or more of the sets of actions include one or more of the following actions: (i) shipping a replacement hardware component to the data processing system of the data processing systems, (ii) performing maintenance on a hardware component of the data processing system of the data processing systems, (iii) disabling a function of a data processing system of the data processing systems, (iv) transferring a workload from a first data processing system of the data processing systems to a second data processing system of the data processing systems, (v) disabling a hardware component of a data processing system of the data processing systems, and (vi) sending a notification to an administrator of a data processing system of the data processing systems of a predicted impairment of the data processing system.

At operation 314, an action set based on the prediction package to service the data processing system support request is performed. The action set may be automatically performed or may be performed based on input from a user.

For example, the action set may be automatically performed by issuing instructions to a management controller hosted by a data processing system. The management controller may automatically perform the actions.

In an embodiment, the action set is performed by rank ordering the sets of actions based on the prediction resolution times for the sets of actions included in the prediction package. A set of actions based on the rank ordering may be performed. For example, the highest ranked (e.g., lowest time to resolution, highest success rate, etc.) action set may be performed.

In another example, a graphical user interface based on the prediction package may be presented to a user. User input may be received via the graphical user interface. The input may indicate actions to be performed.

In an embodiment, the action set is performed by presenting a graphical user interface to a user based on the rank ordering of the portion of the sets of actions. User feedback may be received via the graphical user interface. The user feedback may select the action set.

For example, the graphical user interface may include a listing of action sets that orders the actions sets from most preferable to least preferable (e.g., based on any criteria). The user may then select one of action sets, which may be the highest ranked or a lower ranked action set.

Refer to FIG. 4 for additional details regarding the graphical user interface.

The method may end following operation 314.

While operations 310-314 have been described above as being performed by a data processing system manager, the data processing system manager may utilize other devices to provide this functionality. For example, the data processing system manager may program an onboard management controller with the trained machine learning model. The trained machine learning model may automatically read logs from the host data processing system, and generate corresponding predictions. The onboard management controller may consult with the data processing system aggregator or automatically take action to service the data processing system support requests. In such an implementation, the data processing system support requests may be implicit in the onboard management controller automatically reading logs from the host data processing system as the logs are obtained.

The data processing system manager may update the trained machine learning model over time and program the onboard management systems accordingly (e.g., to use the updated trained machine learning models for prediction purposes).

To manage data processing systems, user input may be collected when deciding how to perform action sets. To do so, a graphical user interface may be generated and/or presented to a user (e.g., through a user's device such as a desktop computer, smart phone, or other computing device).

Turning to FIG. 4, a diagram of a graphical user interface 400 in accordance with an embodiment is shown. Graphical user interface 400 may be presented to a user to inform the user of likely future events for a data processing system, inform the user of actions that may resolve the event, and obtain user input regarding the actions.

Graphical user interface 400 may include predicted events frame 410 which graphical representations of any number of predicted events (e.g., 412). For example, predicted events frame 410 may include, for a data processing system, a listing of events that are likely to occur in the future. In FIG. 4, the list includes freeze, slow down, loss of network, software locked, unable to login, and no audio events. The occurrence of any of these events may not be desirable. These events may be obtained, for example, via the prediction of a trained machine learning model that generates such predictions based on log patterns.

Graphical user interface 400 may also include suggested resolutions frame 420. Suggested resolutions frame 420 may display content related to one of the predicted events of predicted events frame. The content of suggested resolutions frame 420 may be modified by a user selecting one of the predicted events of predicted events frame 410.

Suggested resolutions frame 420 may include graphical representations of the selected predicted event, a predicted time to the event 414, any number of suggested actions 422 for resolving the predicted event, and a predicted time to resolution 424 for each of suggested actions 244.

The suggested actions 422 may be ordered from most to least preferable based on any criteria such as, for example lowest time to resolution, highlight likelihood of success, etc. A user may select one or more of the suggested actions to provide user input indicating that the selected suggested actions are to be performed.

While the graphical user interface is illustrated in FIG. 4 as including specific types of representations of specific types of information, a graphical user interface may include additional, fewer, and/or different types of representations of similar and/or different data from that shown without departing from embodiments disclosed herein.

Thus, as illustrated above, embodiments disclosed herein may provide systems and methods usable to analyze and manage data processing systems. By proactively analyzing data processing systems for future events that may occur and methods for resolving these events, embodiments disclosed herein may improve the uptime of such devices, may reduce downtime for management, and/or may provide other benefits.

Figure 5:
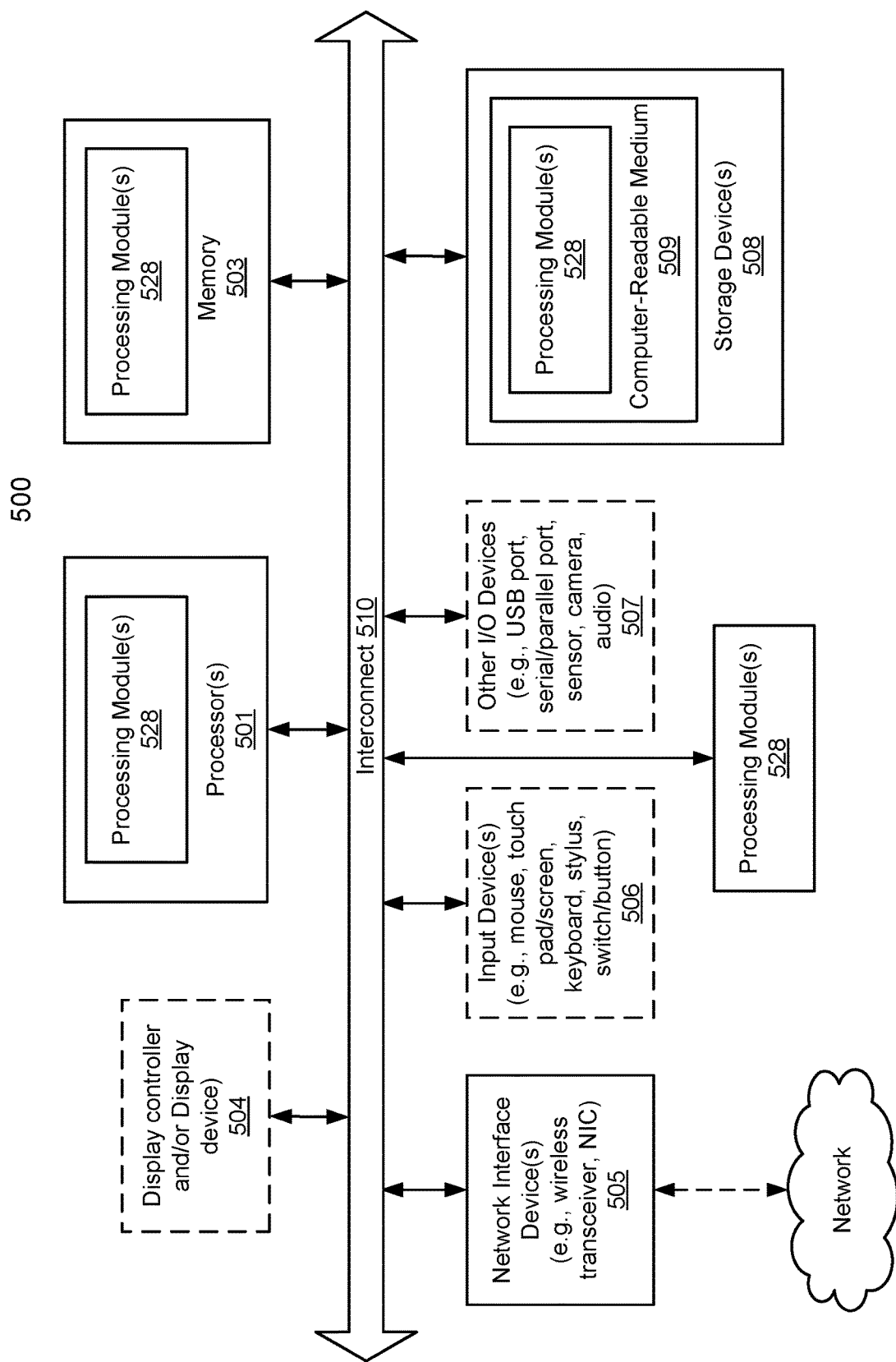
FIG. 5 shows a block diagram illustrating a data processing system in accordance with an embodiment.

Any of the components illustrated in FIGS. 1-4 may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing data processing systems, the method comprising:
   obtaining logs for the data processing systems, each of the logs comprising a first portion of log records associated with an event and a second portion of the log records associated with a resolution for the event;
   identifying an issue cluster based on the first portion of log records for each of the logs;
   identifying a resolution cluster based on the second portion of the log records for each of the logs;
   obtaining a trained machine learning model using the issue cluster and the resolution cluster for each of the logs, the trained machine learning model being adapted to predict, for a new first portion of log records:
      sets of actions that when performed are likely to lead to the resolution, and
      a resolution time between the event and the resolution for each of the sets of actions;
   obtaining a data processing system support request for a data processing system of the data processing systems, the support request including a new portion of log records;
   obtaining, using the trained machine learning model and the new portion of log records, a prediction package, the prediction package comprising:
      a predicted event,
      a portion of the sets of actions that are likely to lead to a predicted resolution for the predicted event, and
      predicted resolution times for the sets of actions; and
   performing an action set, based on the prediction package, to service the data processing system support request.

2. The computer-implemented method of claim 1, wherein identifying the issue cluster based on the first portion of log records for each of the logs comprises:
   calculating a similarity level between each of the first portion of log records of the logs; and
   grouping the first portion of log records into issue clusters based on the calculated similarity levels between each of the first portion of log records of the logs.

3. The computer-implemented method of claim 2, wherein identifying the resolution cluster based on the second portion of the log records for each of the logs comprises:
   for each of the issue clusters:
      calculating a similarity level between each of the second portion of the log records of the logs that are associated with the respective issue cluster; and
      grouping the second portion of the log records of the logs that are associated with the respective issue cluster into resolution clusters based on the calculated similarity levels between each of the second portion of the log records of the logs that are associated with the respective issue cluster to obtain a portion of the resolution clusters that are associated with each of the issue clusters.

4. The computer-implemented method of claim 3, wherein obtaining the trained machine learning model using the issue cluster and the resolution cluster for each of the logs comprises:
   obtaining a set of associations between an event associated with an issue cluster of the issue clusters and the sets of actions associated with each resolution cluster of the portion of the resolution clusters that are associated with the issue cluster; and
   training a machine learning model based on the set of associations.

5. The computer-implemented method of claim 4, wherein the set of associations are further obtained by:
   associating a resolution time with each respective event for each of the associated sets of actions, the set of associations thereby providing, for a given event, any number of sets of actions and resolution times for the sets of actions.

6. The computer-implemented method of claim 1, wherein performing the action set, based on the prediction package, to service the data processing system support request comprises:
   rank ordering the portion of the sets of actions based on the prediction resolution times for the sets of actions; and
   performing a set of actions of the portion of the sets of actions based on the rank ordering of the portions of the sets of actions.

7. The computer-implemented method of claim 6, wherein performing the set of actions of the sets of actions based on the rank ordering of the portions of the sets of actions comprises:
   presenting a graphical user interface to a user based on the rank ordering of the portion of the sets of actions; and
   receiving user feedback via the graphical user interface, the user feedback selecting the set of actions of the sets of actions.

8. The computer-implemented method of claim 6, wherein the set of actions of the portion of the sets of actions comprises:

shipping a replacement hardware component to the data processing system of the data processing systems.

9. The computer-implemented method of claim 6, wherein the set of actions of the portion of the sets of actions comprises:
performing maintenance on a hardware component of the data processing system of the data processing systems.

10. The computer-implemented method of claim 6, wherein the set of actions of the portion of the sets of actions comprises:
disabling a function of a data processing system of the data processing systems.

11. The computer-implemented method of claim 6, wherein the set of actions of the portion of the sets of actions comprises:
transferring a workload from a first data processing system of the data processing systems to a second data processing system of the data processing systems.

12. The computer-implemented method of claim 6, wherein the set of actions of the portion of the sets of actions comprises:
disabling a hardware component of a data processing system of the data processing systems.

13. The computer-implemented method of claim 6, wherein the set of actions of the portion of the sets of actions comprises:
sending a notification to an administrator of a data processing system of the data processing systems of a predicted impairment of the data processing system.

14. A non-transitory machine-readable medium having instructions stored therein, which when executed by a processor, cause the processor to perform operations for managing data processing systems, the operations comprising:
obtaining logs for the data processing systems, each of the logs comprising a first portion of log records associated with an event and a second portion of the log records associated with a resolution for the event;
identifying an issue cluster based on the first portion of log records for each of the logs;
identifying a resolution cluster based on the second portion of the log records for each of the logs;
obtaining a trained machine learning model using the issue cluster and the resolution cluster for each of the logs, the trained machine learning model being adapted to predict, for a new first portion of log records:
sets of actions that when performed are likely to lead to the resolution, and
a resolution time between the event and the resolution for each of the sets of actions;
obtaining a data processing system support request for a data processing system of the data processing systems, the support request including a new portion of log records;
obtaining, using the trained machine learning model and the new portion of log records, a prediction package, the prediction package comprising:
a predicted event,
a portion of the sets of actions that are likely to lead to a predicted resolution for the predicted event, and
predicted resolution times for the sets of actions; and
performing an action set, based on the prediction package, to service the data processing system support request.

15. The non-transitory machine-readable medium of claim 14, wherein identifying the issue cluster based on the first portion of log records for each of the logs comprises:
calculating a similarity level between each of the first portion of log records of the logs; and grouping the first portion of log records into issue clusters based on the calculated similarity levels between each of the first portion of log records of the logs.

16. The non-transitory machine-readable medium of claim 15, wherein identifying the resolution cluster based on the second portion of the log records for each of the logs comprises:
for each of the issue clusters:
calculating a similarity level between each of the second portion of the log records of the logs that are associated with the respective issue cluster; and
grouping the second portion of the log records of the logs that are associated with the respective issue cluster into resolution clusters based on the calculated similarity levels between each of the second portion of the log records of the logs that are associated with the respective issue cluster to obtain a portion of the resolution clusters that are associated with each of the issue clusters.

17. The non-transitory machine-readable medium of claim 16, wherein obtaining the trained machine learning model using the issue cluster and the resolution cluster for each of the logs comprises:
obtaining a set of associations between an event associated with an issue cluster of the issue clusters and the sets of actions associated with each resolution cluster of the portion of the resolution clusters that are associated with the issue cluster; and
training a machine learning model based on the set of associations.

18. A data processing system manager, comprising:
a processor; and
a memory coupled to the processor to store instructions, which when executed by the processor, cause the processor to perform operations for managing data processing systems, the operations comprising:
obtaining logs for the data processing systems, each of the logs comprising a first portion of log records associated with an event and a second portion of the log records associated with a resolution for the event;
identifying an issue cluster based on the first portion of log records for each of the logs;
identifying a resolution cluster based on the second portion of the log records for each of the logs;
obtaining a trained machine learning model using the issue cluster and the resolution cluster for each of the logs, the trained machine learning model being adapted to predict, for a new first portion of log records:
sets of actions that when performed are likely to lead to the resolution, and
a resolution time between the event and the resolution for each of the sets of actions;
obtaining a data processing system support request for a data processing system of the data processing systems, the support request including a new portion of log records;
obtaining, using the trained machine learning model and the new portion of log records, a prediction package, the prediction package comprising:
a predicted event,
a portion of the sets of actions that are likely to lead to a predicted resolution for the predicted event, and
predicted resolution times for the sets of actions; and
performing an action set, based on the prediction package, to service the data processing system support request.

19. The data processing system manager of claim 18, wherein identifying the issue cluster based on the first portion of log records for each of the logs comprises:

calculating a similarity level between each of the first portion of log records of the logs; and grouping the first portion of log records into issue clusters based on the calculated similarity levels between each of the first portion of log records of the logs.

20. The data processing system manager of claim 19, wherein identifying the resolution cluster based on the second portion of the log records for each of the logs comprises:

for each of the issue clusters:

calculating a similarity level between each of the second portion of the log records of the logs that are associated with the respective issue cluster; and grouping the second portion of the log records of the logs that are associated with the respective issue cluster into resolution clusters based on the calculated similarity levels between each of the second portion of the log records of the logs that are associated with the respective issue cluster to obtain a portion of the resolution clusters that are associated with each of the issue clusters.

\* \* \* \* \*